Inventor:
Barry Dynes
BY Baldwin Wight Diller & Brown
Attorneys

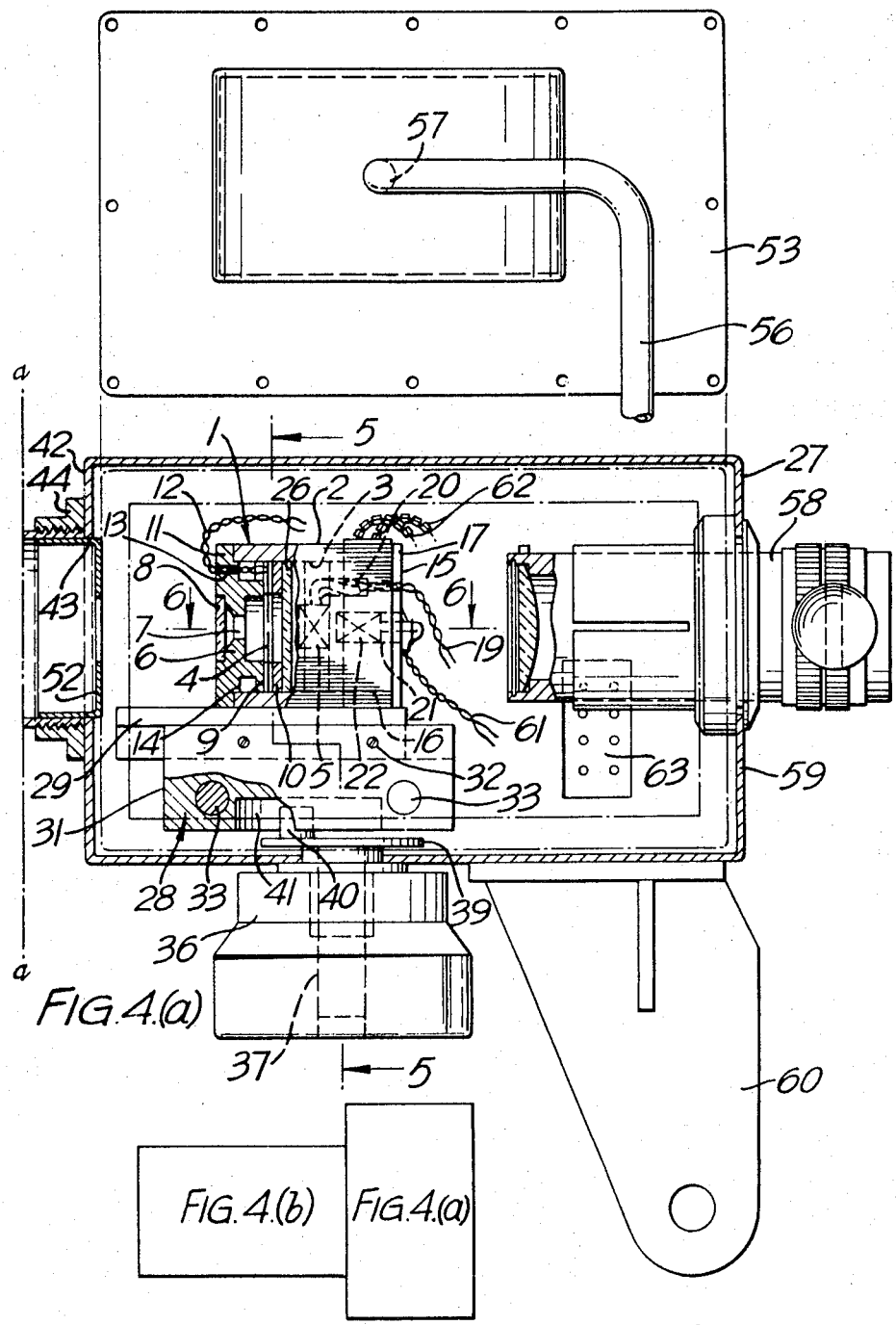

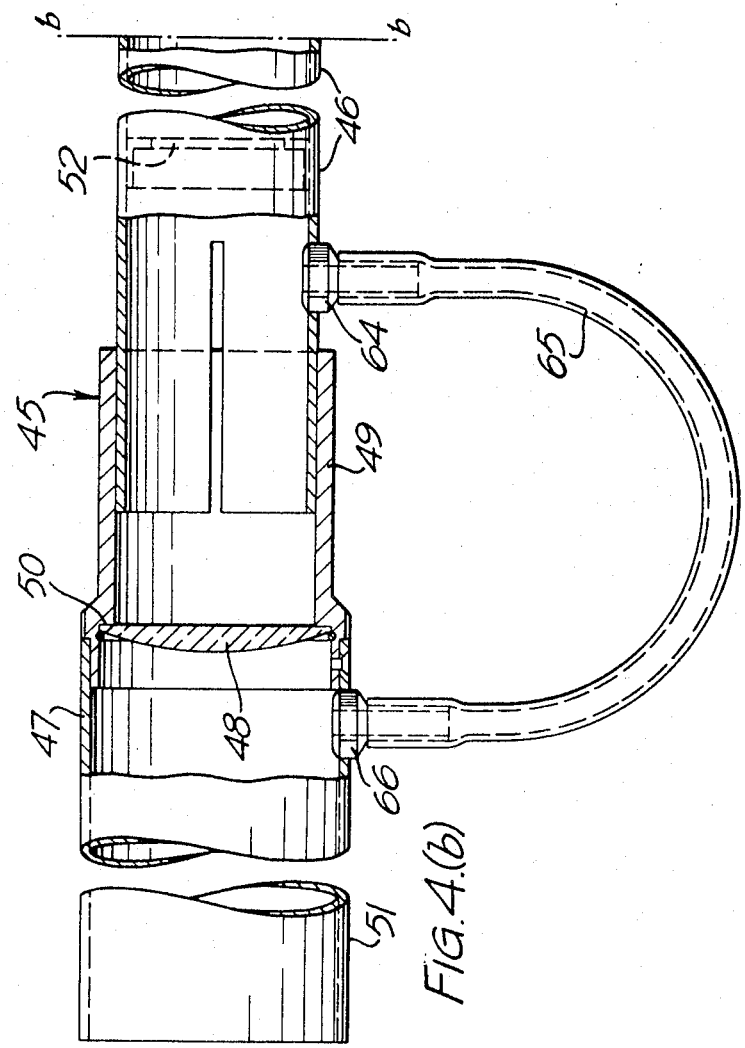

United States Patent Office 3,454,769
Patented July 8, 1969

3,454,769
TWO-COLOUR RADIATION RATIO PYROMETER
Barry Dynes, Kent, England, assignor to The Associated Portland Cement Manufacturers Limited, London, England
Filed Mar. 10, 1967, Ser. No. 622,136
Claims priority, application Great Britain, Mar. 15, 1966, 11,277/66
Int. Cl. G21h 5/00
U.S. Cl. 250—83.3                 14 Claims

ABSTRACT OF THE DISCLOSURE

A ratio pyrometer comprising two radiation transducers inherently responsive to different bands of the wavelength of the radiation being measured. A thermopile and silicon photovoltaic cell are preferred the outputs of which are compared by a self balancing potentiometer. Optical band pass filters may be associated with the transducers but are inessential.

---

This invention relates to radiation pyrometers and particularly to ratio pyrometers also called two colour pyrometers.

Various types of ratio pyrometers, which use the ratio of the radiant energy from two spectral bands to indicate the surface temperature of a radiant body, are known. Some types use a photomultiplier as a detector. The photomultiplier tube output is usually synchronised with band pass filters and fed to an amplifier with a logarithmic characteristic and then to a difference amplifier, to give temperature indication. Other types use photo cells as detectors and a beam splitter to direct the light on to them through static filters. These types usually operate in the visible or near visible part of the spectrum and because of this the band pass filters have to be carefully selected if a flame is present in a furnace the temperature of material in which is to be measured. The reason for this is that carbon in the flame will be at a much higher temperature than the material in the furnace. This material will therefore reflect some fraction of this higher light and result in a high reading being given.

It is the object of this invention to provide a ratio pyrometer which avoids the expense of and obviates faults usually associated with complicated electronic circuits and mechanical wear on fast moving parts i.e. rotary filters or beam splitters hitherto needed or employed.

According to this invention a ratio pyrometer comprises two radiation transducers arranged simultaneously to receive radiation from a source to be measured, the radiation transducers being inherently responsive to different bands of the wavelength of the radiation emitted by the source.

Preferably one radiation transducer comprises a thermopile and the other a solid state photoelectric transducer, the latter preferably being a silicon photovoltaic cell, although other photovoltaic cells may be employed as may be photoresistors e.g. photodiodes or phototransistors.

Alternatively however in place of the thermopile a thermo resistance element or bolometer, e.g. a thermistor, or a thermistorpile arranged to be resistant additive, may be employed.

As a further alternative a photo cell may be employed in place of the thermopile.

In order to increase the efficiency of the radiation transducers and to eliminate unwanted wavelengths one or more optical band pass filters or other filter means may be associated with the transducers.

Although it would be possible to arrange the two radiation transducers side by side, simultaneously to receive radiation, preferably they are arranged one behind the other on a common optical path, the first radiation transducer being of course so constructed that it does not obscure the second.

Further to explain the purpose and arrangement of filter means, when provided, it may be that the radiation transducers which are chosen on account of the fact that due to their inherent spectral sensitivity they only respond to selected spectral bands, may in some degree sense unwanted wavelengths if exposed to total radiation from a source to be measured. Accordingly filter means may be disposed in front of both transducers to eliminate the unwanted wavelengths, when the transducers are arranged one in front of the other only one filter means of course being necessary. The provision of such filter means would be an advantage if it was desired to use the pyrometer to measure the temperature of a material having high emission bands in the sensitive region of one of the two transducers thus reducing calibration error.

In order to increase the efficiency and sensitivity of the pyrometer it is desirable that the second transducer should only be responsive to a very narrow spectral band. Accordingly filter means may be disposed in front of the second transducer. Clearly the filter means may be disposed between the two transducers or, if the transducers are arranged other than one behind the other, in front of only the relevant one of them for this purpose, either in the presence or absence of other filter means to limit the total radiation received by both transducers.

Preferably the radiation transducers are disposed in an airtight housing to exclude dust or the like and also when the nature of the transducers requires it, to enable means to be provided for controlling their temperature, e.g. to maintain the temperature of the cold junctions of the thermopile and the temperature of the photo electric transducer constant. Preferably in order to control the temperature a heating element is associated with the housing arranged under the control of a thermometer, for example a resistance thermometer incorporated in the housing, means being provided continuously to pass a stream of cooling air round the housing the latter desirably being provided with cooling fins.

It is to be understood that the different bands of the wavelength of the radiation emitted by the source being measured, to which the radiation transducers are selected to be responsive, may either be entirely separate, may overlap, or one may fall wholly within the other.

It will also be appreciated that the necessary electronic accessory required by a pyrometer in accordance with the invention may be the simplest self-balancing potentiometric recorded from which the measurement and reference voltage circuits can indeed be removed. Further the pyrometer requires no rotary filters or beam splitters.

The invention is further described below with reference to the accompanying drawings in which.

FIGURES 4(a) and 4(b) together constitute a longitudinal sectional view of a preferred construction of a pyrometer in accordance with the invention, these figures being intended to be read together as joined along the respective lines a—a and b—b, the composite of FIGURES 4(a) and 4(b) being hereinafter referred to as FIGURE 4.

Figure 5:
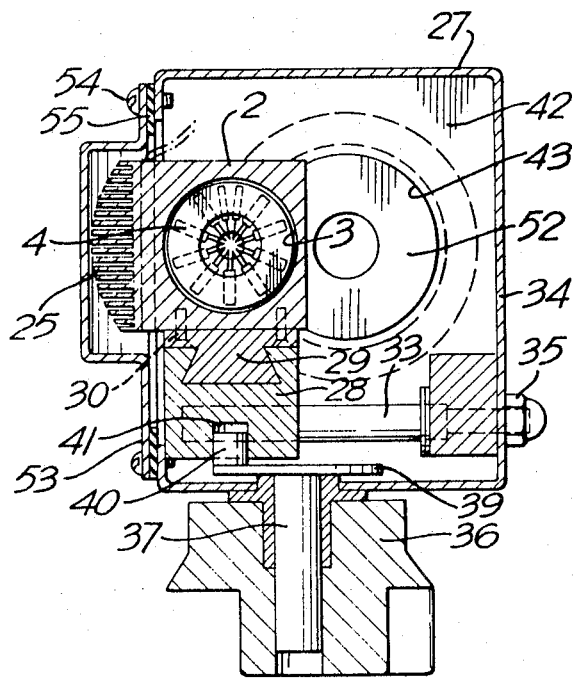
Figure 6:
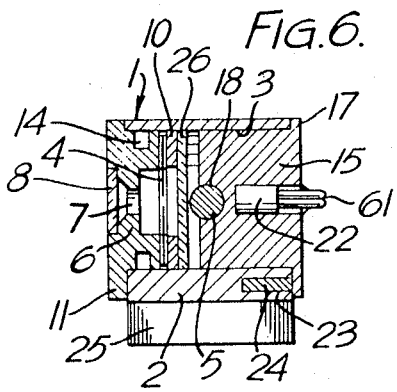

FIGURE 5 is a section on the line 5—5 of FIGURE 4;

FIGURE 6 is a section on the line 6—6 of FIGURE 4, and

Figure 7:
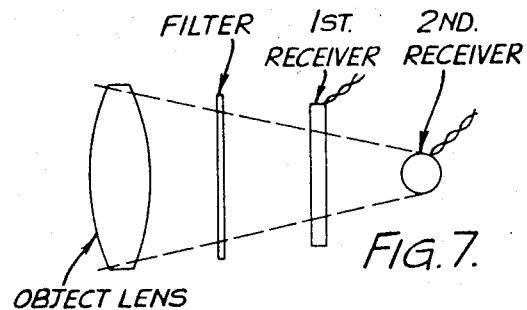
Figure 8:
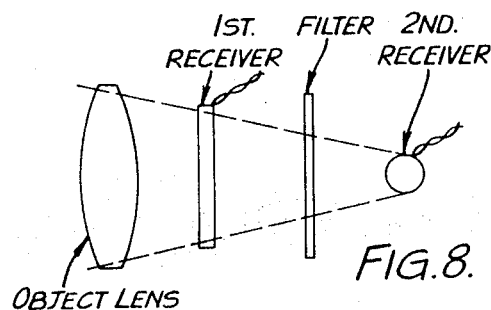
Figure 9:
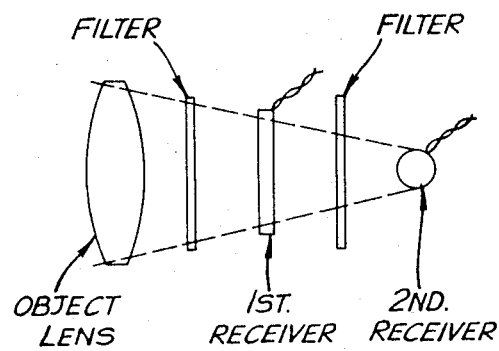

FIGURES 7 to 9 are diagrams indicating alternative manners in which filter means may be associated with the radiation transducers which the pyrometer comprises.

Referring to FIGURES 4 to 6 of the drawings a ratio pyrometer comprises a detector head generally indicated at 1 consisting of a housing formed of an aluminium block 2 provided with a cylindrical bore 3 within which are disposed, in spaced coaxial relationship, a thermopile 4 and a silicon cell 5. At its front end the bore 3 in the block 2 is closed by a plug 6 formed with a centrally positioned aperture 7 which is closed by a glass window 8. The thermopile 4 is secured to the rear face 9 of the plug 6 being held in position by a retaining washer 10 which is secured to the plug by means of screws (not shown). The plug 6 is provided as indicated with a reduced diameter portion adapted to form a tight sliding fit within the bore 3 and to define a peripheral flange 11 to abut the front end face of the block 2, to which the plug 6 is secured by means of screws (not shown), passed through the flange 11. The leads to the thermopile indicated at 12 are passed through a drilling 13 in the plug 6 which communicates with an annular groove 14 formed in the reduced diameter portion of the plug 6 around which groove the leads are passed so that they are conveniently housed within the plug and do not constitute an obstruction to the insertion or removal thereof. The rear end of the bore 2 is closed by a plug 15 having a reduced diameter portion 16 forming a tight sliding fit within the bore 3 and defining a peripheral flange 17 to abut the rear end of the block 2 to which the plug is secured by screws in a manner similar to the plug 6. A diametrally extending groove 18 of arcuate cross section is formed in the inner face of the plug 15 to house the silicon cell 5. The leads 19 of the silicon cell are passed through a drilling 20 in the plug 15 which communicates with one end of the groove 18. A bore 21 is formed in the plug 15, terminating short of the groove 18 in which a resistance thermometer 22 is disposed. A vertically extending slot 23 is cut in the rear face of the block 2 the open side of which is arranged to be closed by the peripheral flange 17 of the plug 15 when the detector head is assembled, the slot 23 serving to house a heating element 24. As shown the side of the block 2 adjacent the heating element 24 is formed with cooling fins 25.

In the space remaining within the bore 3 between the inner ends of the plugs 6 and 15 an optical band pass filter 26 is disposed the filter being arranged to form a tight fit within the bore 3.

The detector head is mounted within a casing 27 on a two part carriage, generally indicated at 28 comprising a first part 29 to which the block 2 is secured as by screws indicated at 30, the part 29 being arranged to be slidable in a longitudinal direction with respect to the second part 31 of the carriage, and to be fixed in any given position with respect thereto by means of grub screws indicated at 32. The part 31 is arranged to be traversable in a direction transverse to the longitudinal axis of the detector head, along a pair of guide rods 33 which are anchored to the side wall 34 of the casing 27, by means of nuts 35. The carriage 28 is arranged to be traversed along the guide rods 33 by means of a knob 36 secured to the free end of a shaft 37 journaled in the lower wall 38 of the casing 27 and mounting a disc 39 to which an eccentrically disposed pin 40 is secured to engage in a longitudinally extending slot 41 in the lower face of the part 31 of the carriage.

The front wall 42 of the casing 27 is provided with an aperture 43 around which an internally screw threaded coupling piece 44 is secured to receive a telescopic assembly generally indicated at 45. The telescopic assembly comprises a tube 46 which is screwed to the coupling piece 44 and a tubular mount 47 for an objective lens 48, the mount being provided at its rear end with a reduced diameter portion 49 which defines a shoulder 50 within the mount 47 to locate the lens 48, and which forms a sliding fit over the free end of the tube 46. A tubular shield 51 is screwed to the front end of the mount 47. Annular stops 52 are provided within the tube 46 to cut out reflection from the inner wall thereof.

The casing 27 which is otherwise of integral construction is provided with a detachable side wall 53 secured to the casing by means of screws indicated at 54 with the interposition of a rubber or like gasket 55. A pipe 56 is secured to the side wall 53 leading to an aperture 57 therein which is positioned adjacent the side of the detector head 2.

A viewing device 58 is mounted in the rear wall 59 of the casing, opposite the aperture 43 in the front wall thereof, by means of which a target at which the pyrometer is directed may be viewed when desired, for which purpose it is necessary to traverse the detector head to the position shown in FIGURE 6 in which it is clear of the view path.

A bracket 60 is secured to the lower wall of the casing 27 to enable it to be mounted as desired to any convenient support.

The leads 12 and 19 from the thermopile and silicon cell respectively, and also the leads indicated at 61 and 62 from the thermometer 22 and heating element 24 respectively are conveniently led to an 8 pin socket indicated at 63 in FIGURE 4 from which an eight core cable can be conveniently led to the necessary control and recording equipment with which the pyrometer is associated.

The thermopile 4 may comprise 10 Pt/Pt—13% Rh thermocouples connected in series and disposed symmetrically about an axis coincident with the longitudinal axis of the bore 3 which is of course when the pyrometer is in use positioned in line with the aperture 43 in the front wall 42 of the casing, so as simultaneously to permit exposure of the thermopile 4 and the photo cell 5 to radiation from a source being measured. The thermopile in the arrangement shown of course receives the total radiation but is selected to be most sensitive to the infrared portion of the radiation.

The filter 26 is of course provided to limit the radiation received by the silicon cell 5, to a narrow band only of the wavelength of the radiation received by the thermopile 4. Preferably the filter is of the interference type. When the second radiation transducer comprises a silicon cell a filter having a band width of 400–800 A. centered between 0.7 and 1 micron is used. Good results have been achieved using a filter having a band width of 582 A. centered on 9711 A.

When alternatively the second radiation receiver comprises a phototransistor a filter having a band width of 400–800 A. centered between 0.9 and 1.7 microns is used. The lens 48 is selected so as to provide a narrow field of view of that zone of the radiation source which is to be measured, for example 9" at 16 ft. In the embodiment described herein the lens had a diameter of 1⅞ inches and a focal length of 10½ inches which is a convenient size to permit the lens tube to be of suitable length to fit a radiation shield.

When the pyrometer is set up for use it is arranged to focus a beam of radiation from the source to be measured at a point slightly behind the silicon cell 5. Fine adjustment of the focus can simply be effected by adjusting the position of the mount 47 on the tube 46 and/or by appropriate movement of the upper part 29 of the carriage 28 on the lower part 31 thereof.

It being necessary in order to obtain accurate measurements to maintain the cold junctions of the thermopile at a predetermined temperature, for example 80° F.±0.1° F., and also to maintain the temperature of the silicon cell constant within similar limits since the EMF generated thereby will vary with changes in temperature, the temperature of the block is continuously measured by the resistance thermometer 22 which is connected to a transistorised temperature controller (not shown) arranged to correct any offset by heating the block 2 by means of the heating element 24.

Low temperature clean air under sufficient pressure to afford cooling of the block is continuously supplied to the casing 27 via the pipe 56. The stream of air also serves the purpose of purging dust from the interior of the casing the air being arranged to pass from the casing via the aperture 43 into the tube 46 which is provided with a nipple 64 to which a flexible pipe 65 is secured leading to a nipple 66 with which the mount 47 is provided adjacent the front face of the lens 48. Hence in this way dust is also purged from the lens system and the lens is kept cool.

Figure 1:
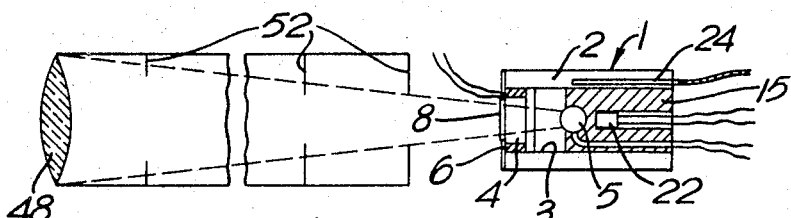
FIGURE 1 is a diagrammatic view of a pyrometer in accordance with the invention.
Figure 2:
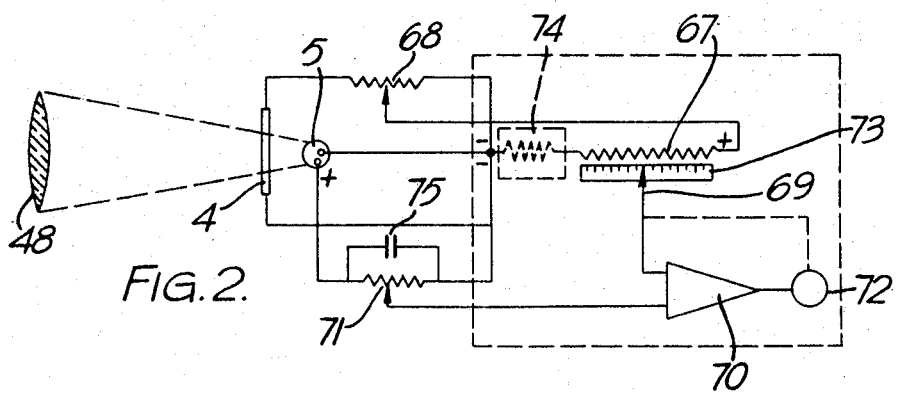
FIGURE 2 is a circuit diagram of the electrical equipment associated therewith.

While in the specific embodiment described above in connection with FIGURES 4 to 6 a band pass filter is provided between the thermopile and silicon cell to limit the exposure of the silicon cell to a narrow band only of the wave length of the radiation received by the thermopile, this is not esential. Accordingly as indicated in FIGURES 1 and 2 the filter may be omitted.

Alternatively as also mentioned at the outset if desired a filter may be positioned in front of both radiation transducers to eliminate unwanted wavelengths. Three possible alternative arrangements of filters are indicated in FIGURES 7 to 9. These of course show arrangements in which the two radiation transducers are arranged in spaced coaxial arrangement, as is preferred. Filter means when provided to eliminate unwanted wavelengths conveniently comprise a glass filter, of the absorptive type. One having a band width of from 0.7 to 2.8 microns has given good results when transducers in the form of a thermopile and silicon cell are employed. Such a band pass filter when provided may be arranged to serve as the window closing the aperture 7 in the plug 6 of the detector head.

Figure 3:
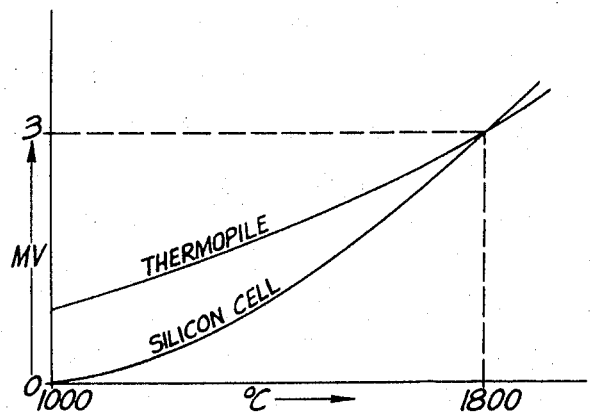
FIGURE 3 is a graph showing the relationship of the voltage output of the pyrometer relative to the temperature.

FIGURE 3 illustrates a typical relationship between the temperature of a source, radiation from which is received by a thermopile and a silicon cell, and the output potentials thereof. The ratio of corresponding potential values on these curves at any given temperature is a fraction of that temperature. Similar differential characteristics can be obtained when one or both the transducers is photoconductive.

Accordingly the transducers are connected to means for comparing the ratio of the parameters of the transducers which are dependent upon the received radiation, in order to obtain a temperature indication.

When the transducers are photovoltaic, for example as is preferred comprise a thermopile and a silicon cell, the ratio of the output potentials of the thermopile and silicon cell is conveniently determined by potentiometric means.

These means preferably comprise a self balancing potentiometer such as that indicated in FIGURE 2. As shown therein the potentiometer comprises a high resistance slidewire 67 which is connected through a first potential divider 68 across the thermopile 4. The slider 69 of the potentiometer is connected through the input of an amplifier 70 and a second potential divider 71 across the silicon cell. The output of the amplifier 70 is connected to a servometer 72 arranged to maintain the slider 69 in a balanced position. The slider 69 may be arranged itself to act as or to carry a pointer to give an indication on a scale as indicated at 73. Any desired indicating or recording means can clearly be arranged to be operated by the slider 69.

Calibration of the instrument is effected by adjustment of the potential dividers 68 and 71. A resistor 74 may be inserted in series with the slide wire 67 to set the instrument to indicate over a desired temperature range. The response time of the silicon cell being short in comparison with that of the thermopile, a capacitor 75 is shunted across the potential divider 71 and has such capacitance that, in co-operation with the resistance of the potential divider 71, it effectively increases the response time of the silicon cell 5 to match that of the thermopile.

If the field of view of the pyrometer is partially obsecured by dust the intensity of the radiation received by the two transducers will be reduced. However the intensities of both bands of the wavelength of the radiation to which the transducers are responsive, will be reduced by the same fraction. Therefore the ratio of the output potential of the two transducers remains constant. When the pyrometer is shut off from the source of radiation, the last reading will be maintained. This is because the output potential of both the transducers will have been reduced to zero and their ratio is thus indeterminate and the instrument must await for another ratio before changing its reading, though in practice the reading may drift slowly because of the discharging of the capacitor within the response correcting circuit.

When the second transducer is photoconductive e.g. comprises a phototransistor having associated with it a resistive network so as to cause a change in voltage corresponding to the radiation intensity received, the addition of a regulated excitation voltage is necessary to enable the corresponding changing voltage to be fed to the potentiometric ratio comparing means in the same manner as when a silicon cell is employed. Similarly when the first transducer is photoconductive e.g. comprises a thermistor pile associated with a resistive network an excitation voltage is necessary.

When a phototransistor is employed one having a narrow spectral response peaking around 1.6 microns is preferred. A thermistor pile when employed is conveniently in the form of several thermistor beads connected in series and disposed symmetrically about an axis coincident with the optical path. The surface of the thermistor beads can be treated to limit their sensitivity to the required waveband.

What is claimed is:

1. A radiation ratio pyrometer comprising a first and a second radiation transducer, means for directing primary radiation from a source of radiant energy to be measured along a substantially unidirectional path without being subjected to reflection and to said first and second transducers, said first and second transducers being inherently responsive respectively to different bands of the wavelength in the frequency spectrum of the radiation emitted by the source, and means for comparing the ratio of the parameters of the transducers which are dependent upon the radiation received thereby.

2. A pyrometer as claimed in claim 1 in which the first radiation transducer comprises a thermopile and the second a solid-state photoelectric transducer.

3. A pyrometer as claimed in claim 1 in which the first radiation transducer comprises at least one thermistor and the second a solid state photoelectric transducer.

4. A pyrometer as claimed in claim 2 in which the solid-state photoelectric transducer comprise a silicon photovoltaic cell.

5. A pyrometer as claimed in claim 1 in which the means for comparing the ratio of the said parameters of the transducers comprise a self balancing potentiometer.

6. A pyrometer as claimed in claim 2 including means mounting the radiation transducers in spaced coaxial relation on a common optical path.

7. A pyrometer as claimed in claim 6 including an optical band pass filter positioned in the said optical path of the radiation receiver to eliminate unwanted wavelengths of the radiation.

8. A pyrometer as claimed in claim 2 including means mounting the thermopile in space coaxial relation with respect to and in advance of the photoelectric transducer, on a common optical path, and an optical band pass filter interposed between the thermopile and the photoelectric transducer in order to limit the exposure of the latter to a narrow band only of the wavelength of the radiation received by the thermopile.

9. A pyrometer as claimed in claim 1 including an airtight housing, means mounting said first and second transducers in said housing in spaced coaxial relationship, said first transducer comprising a thermopile and said second transducer comprising a solid-state photoelectric transducer, temperature responsive means associated with the housing and means controlled by the temperature responsive means for maintaining the temperature of the housing and hence that of the cold junctions of the thermopile and the photoelectric transducer substantially constant.

10. A pyrometer as claimed in claim 9 in which the means for maintaining the temperature comprise a heating element and means for directing a cooling stream of air past the housing.

11. A pyrometer as claimed in claim 10 including a casing, means mounting the housing therein, cooling fins on the housing and means for passing the stream of cooling air through the casing.

12. A pyrometer as claimed in claim 2 in which the thermopile is selected to be most sensitive to the infra-red portion of the spectrum.

13. A pyrometer as claimed in claim 11 including means mounting said radiation directing means on said casing means mounting a viewing device on the casing in line with the optical path of the radiation directing means, the said means mounting said housing in said casing comprising a carriage and means for moving the said carriage between a first position in which the housing is aligned with the optical path of the radiation directing means, and a second position in which the housing lies outside the view path of the viewing device to enable the source on which the radiation directing means is focused to be viewed therethrough.

14. A pyrometer as claimed in claim 13 on which the radiation directing means comprise a lens selected to provide a narrow field of view of that zone of the radiation source which is to be measured.

References Cited

UNITED STATES PATENTS

| 3,130,308 | 4/1964 | Astheimer. |
| 3,209,154 | 9/1965 | Maring _____ 250—212 X |
| 3,251,996 | 5/1966 | Johnson et al. |
| 3,278,746 | 10/1966 | Fiat. |

ARCHIE R. BORCHELT, *Primary Examiner.*

U.S. Cl. X.R.

73—355; 250—212